Patented July 9, 1929.

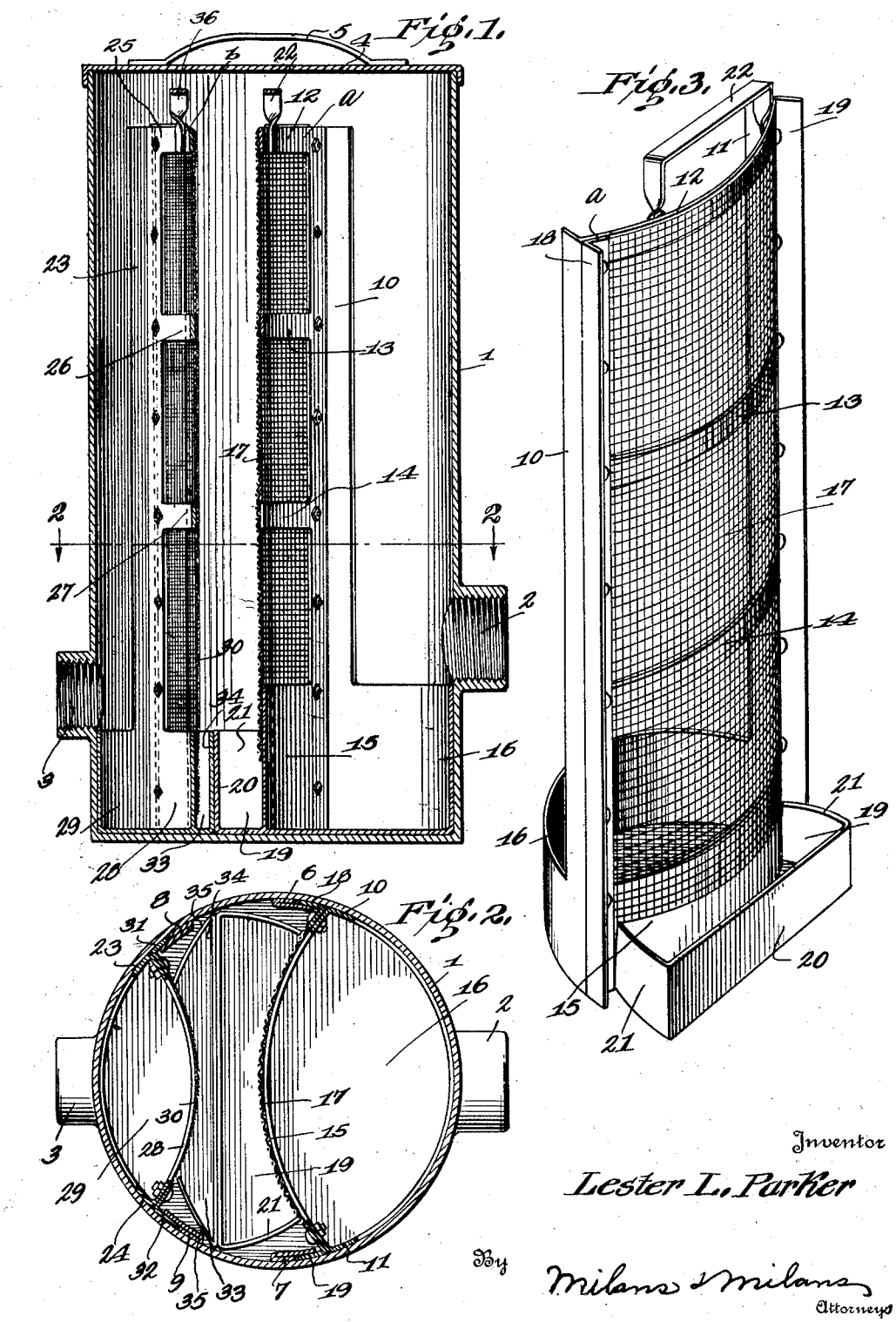

1,720,433

UNITED STATES PATENT OFFICE.

LESTER LELAND PARKER, OF GREENSBORO, NORTH CAROLINA.

TRAP.

Application filed March 27, 1928. Serial No. 265,109.

My invention relates to new and useful improvements in traps for separating impurities such as sediment and the like from liquids and has for its principal object the provision of a trap consisting of a casing having an inlet and an outlet opening, means being provided between such openings for separating the impurities from the liquid, the impurities in the form of sediment or the like being discharged into a suitable receptacle for removal from the casing.

Another object of the invention resides in the provision of a trap of the character described in which a baffle is positioned between the inlet and outlet openings of the casing, the baffle including a portion of screening or wire mesh through which the liquid is adapted to pass, the impurities being separated by the screening or wire mesh from the liquid and being allowed to drop into a suitable receptacle for removal.

A further object consists in so forming the casing and baffle that the baffle is readily removable, the casing being provided with a suitable top or cover which may be removed or opened for the removal of the baffle.

Still another object of the invention resides in the formation of the baffle with a suitable receptacle adjacent the lower end for catching the impurities or sediment so that the said impurities or sediment will be removed from the casing by the removal or withdrawal of the baffle.

A still further object resides in the provision of means whereby a plurality of baffles may be positioned within the casing and so positioned that the liquid will pass therethrough when flowing from the inlet to the outlet of the casing, each of said baffles being readily removable from the casing and provided with a receptacle for receiving the impurities or sediment which is separated from the liquid.

With the above and other objects in view, which will appear as the description proceeds, my invention consists in the novel details of construction, and arrangement of parts, described in the following specification and illustrated in the accompanying drawings, and while I have illustrated and described the preferred embodiments of the invention, as they now appear to me, it will be understood that such changes may be made as will fall within the scope of the appended claims.

In the drawings:—

Fig. 1 is a transverse vertical section through the trap with parts shown in elevation.

Fig. 2 is a horizontal section on the line 2—2 of Fig. 1 looking in the direction of the arrows; and Fig. 3 is a perspective of one of the baffles removed from the casing.

While my improved form of trap may be used for separating impurities from various kinds of liquids it is nevertheless particularly adapted for purifying gasoline, varnolene and similar liquids used in the dry process of cleaning clothes but it will be understood that I do not limit myself to this particular use.

In the drawings 1 indicates the casing, which I have shown as cylindrical in form, provided with the inlet opening 2 and the outlet opening 3, as shown in Fig. 1 the inlet opening 2 being preferably upon a somewhat higher level than the outlet opening 3 so that the liquid may be more readily flowed through the trap. A removable cover for the casing is shown at 4 and is provided with the handle 5. Interiorly the casing is provided with the vertically extending guideways 6, 7, 8 and 9, the guideway 7 being opposed to the guideway 6 and the guideway 9 being opposed to the guideway 8 as shown more particularly in Fig. 2 of the drawings, the guideways being used for positioning baffles, to be later described, within the casing.

In the drawings I have illustrated two baffles positioned within the casing and extending vertically between the inlet 2 and the outlet 3, the baffles being indicated generally at $a$ and $b$, the baffle $a$ being shown somewhat larger in size than the baffle $b$. The baffle $a$ consists of a frame including the angle iron vertically extending side strips 10 and 11 which are connected by the vertically spaced transversely extending strips 12, 13, 14 and 15, the strip 15, positioned at the bottom, forming the rear wall of a receptacle 16, the front wall of which, is semi-circular in shape to conform to the curvature of the casing 1. As is quite clearly shown in the drawings the vertically shaped strips 12, 13, 14 and 15 are curved and stretched over the strips is a section of screening or wire mesh designated at 17 and the vertical edges of which are secured to the strips 10 and 11 by the angle iron strips 18 and 19. The bottom of the receptacle 16 is extended beyond the opposite face of the screening or wire mesh 17 to also form the bottom for the receptacle 19 the outer wall of which is flat as shown at 20 for a purpose which will be later described. The ends 21 of the receptacle 19 are adapted to engage the face of the wide bottom strip 17 as shown more particularly in Fig. 3 of the drawings. A handle 22 is secured to the top of the frame and is adapted to be used for positioning the baffle within the casing or removing the same therefrom. As is shown the receptacles 16 and 19 are on opposite faces of the wire mesh or screening 17 and when the baffle is within the casing will rest upon the bottom of the casing as shown more particularly in Fig. 1 of the drawings. As shown also in Fig. 1 the top edge of the receptacle 16 is on a somewhat higher plane than the top edge of the receptacle 19 and on such a plane as to be positioned adjacent the inlet opening 2. When the baffle a is within the casing the angle iron strips 18 and 19 will be positioned within the guideways 6 and 7, respectively, as shown more particularly in Fig. 2 of the drawings.

The baffle b is of a construction similar to the baffle a and consists of a frame including the angle iron vertically extending side strips 23 and 24 which are connected by the vertically spaced transversely extending strips 25, 26, 27 and 28, the strip 28, positioned at the bottom forming the rear wall of a receptacle 29, the front wall of which is semi-circular in shape to conform to the curvature of the casing 1. As shown in the drawings the vertically spaced strips 25, 26, 27 and 28 are curved and stretched over the strips is a section of screening or wire mesh designated at 30 and the vertical edges of which are secured to the strips 23 and 24 by the angle iron strips 31 and 32. The bottom of the receptacle 29 is extended beyond the opposite face of the screening or wire mesh 30 to form the bottom for the receptacle 33 the outer wall of which is flat as shown at 34 for a purpose which will be later described. The ends 35 of the receptacle 33 are adapted to engage the face of the wire mesh or screening 30 as shown more particularly in Fig. 2 of the drawings. A handle 36 is secured to the top of the frame and is adapted to be used for positioning the baffle within the casing or removing the same therefrom. The top edge of the receptacle 29 is on a plane to be positioned at the bottom of the outlet opening 3 and the top edge of the receptacle 33 is on a similar plane and on the same plane as the top edge of the receptacle 19 of the baffle a. When the baffle b is within the casing the angle iron strips 31 and 32 engage in the guideways 8 and 9, respectively, as shown more particularly in Fig. 2 of the drawings.

From the above it is thought that the detailed construction of my trap will be clearly understood. When in operation the baffles a and b will be positioned within the casing 1 as shown more particularly in Figs. 1 and 2 of the drawings and the top or cover 4 will be positioned on the casing. The liquid will enter the casing 1 through the inlet 2 and will flow through the wire mesh or screening 17 and 30 of the baffles and then out through the outlet 3. Any impurities within the liquid will be removed by the wire mesh or screening and the sediment or heavy particles will fall into the receptacles 16, 19, 29, 33, it being noted that when the baffles are in position that the flat surfaces of the front walls of the receptacles 19 and 33 will contact whereas the curved surfaces of the outer walls of the receptacles 16 and 29 will contact with and conform to the curved surface of the casing. When it is desired to clean the baffles and to withdraw the same from the casing the cover 4 is removed and the handles 22 and 36 of the baffles a and b, respectively, engaged. The baffles then may be withdrawn from the casing and the wire mesh or screening cleansed. The sediment is withdrawn with the baffles and may be dumped from the receptacles containing the same. It will be seen that I have provided a trap in which impurities may be readily removed from liquid and in which the baffles or separating members may be readily removed for cleansing at the same time withdrawing from the casing the sediment which has been received within the receptacles of the baffles. It will be noted by an examination of the drawings that the mesh of the wire or screening 17 of the baffle a is somewhat larger than the mesh of the wire or screening 30 of the baffle b. The baffle a will therefore separate the larger particles of sediment whereas the baffle b will separate the smaller particles. As the greater amount of sediment will be removed by the baffle a this baffle is somewhat larger in size than the baffle b and the receptacles carried thereby are also somewhat larger than the receptacles carried by the baffle b.

Having fully described my invention what I claim as new and desire to secure by Letters Patent is:

1. A trap of the character described including a casing having an inlet and an outlet, and a removable baffle received within the casing and positioned between the inlet and outlet, said baffle having receptacles formed adjacent the bottom thereof, on opposite faces thereof, and removable from the casing with the baffle.

2. A trap of the character described including a casing having an inlet and an outlet, and a plurality of removable baffles positioned within the casing between the inlet and outlet thereof, each of said baffles having receptacles formed adjacent the lower end thereof, on opposite faces thereof, the receptacles being formed and adapted to completely cover the bottom of the casing when the baffles are within the casing.

3. A trap of the character described including a casing having an inlet and an outlet, and a pair of baffles removably received within the casing and extending vertically between the inlet and outlet, each of said baffles having a receptacle on each face thereof at the bottom, the receptacles on adjacent faces of the baffles contacting when the baffles are within the casing with the receptacles on the opposite faces thereof engaging the wall of the casing.

In testimony whereof I hereunto affix my signature.

LESTER LELAND PARKER.